(12) United States Patent
Mills et al.

(10) Patent No.: US 11,681,146 B2
(45) Date of Patent: Jun. 20, 2023

(54) AUGMENTED REALITY DISPLAY FOR MACULAR DEGENERATION

(71) Applicant: Snap Inc., Santa Monica, CA (US)

(72) Inventors: Brent Mills, Vashon, WA (US); Ashley Parsons-Celestein, Gardena, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/654,490

(22) Filed: Mar. 11, 2022

(65) Prior Publication Data

US 2022/0299773 A1  Sep. 22, 2022

Related U.S. Application Data

(60) Provisional application No. 63/200,619, filed on Mar. 18, 2021.

(51) Int. Cl.
| | | |
|---|---|---|
| *G02B 27/01* | (2006.01) | |
| *G06T 7/70* | (2017.01) | |
| *G06T 19/00* | (2011.01) | |

(52) U.S. Cl.
CPC ............ *G02B 27/0172* (2013.01); *G06T 7/70* (2017.01); *G06T 19/006* (2013.01);
(Continued)

(58) Field of Classification Search
CPC ........ G02B 27/0172; G02B 2027/0138; G02B 2027/0178; G02B 2027/0198; G06T 19/006; G06T 7/70; G09B 21/008
See application file for complete search history.

(56) References Cited

U.S. PATENT DOCUMENTS

| | | |
|---|---|---|
| 6,014,117 A | 1/2000 | Hennessy et al. |
| 8,135,227 B2 | 3/2012 | Lewis et al. |

(Continued)

FOREIGN PATENT DOCUMENTS

| | | |
|---|---|---|
| CN | 115113399 A | 9/2022 |
| WO | WO-2018158347 A1 | 9/2018 |

(Continued)

OTHER PUBLICATIONS

U.S. Appl. No. 17/815,887, filed Jul. 28, 2022, Vision Test and Provision of Prescription Glasses.

(Continued)

*Primary Examiner* — Nelson M Rosario
(74) *Attorney, Agent, or Firm* — Schwegman Lundberg & Woessner, P.A.

(57) ABSTRACT

Disclosed is a providing visual assistance using a head-worn device including one or more display devices and one or more cameras. The method comprises capturing a forward visual field using at least one of the cameras and displaying a portion of the forward visual field in a peripheral field of view using one or more of the display devices. The method may provide improved visual perception for people with macular degeneration. The method may include mapping a central portion of the forward visual field to a near-peripheral field of view, wherein the mapped central portion is displayed in a peripheral field of view using a forward display device of the head-worn device. A portion of the forward visual field may also be displayed in a peripheral field of view using a peripheral display device of the head-worn device.

14 Claims, 8 Drawing Sheets

(52) U.S. Cl.
CPC ............... *G02B 2027/0138* (2013.01); *G02B 2027/0178* (2013.01); *G02B 2027/0198* (2013.01)

(56) References Cited

U.S. PATENT DOCUMENTS

| | | |
|---|---|---|
| 10,445,938 B1 | 10/2019 | Poliakov et al. |
| 10,881,287 B1 | 1/2021 | Ouderkirk et al. |
| 10,969,584 B2 * | 4/2021 | Haddick ............... G06F 1/163 |
| 11,147,662 B2 | 10/2021 | Qureshi et al. |
| 2004/0156554 A1 | 8/2004 | Mcintyre |
| 2009/0122425 A1 | 5/2009 | Van Asbeck |
| 2013/0339043 A1 | 12/2013 | Bakar et al. |
| 2014/0085446 A1 | 3/2014 | Hicks |
| 2017/0184848 A1 | 6/2017 | Vallius |
| 2017/0185830 A1 * | 6/2017 | Srivastava ............ G06F 3/017 |
| 2017/0215724 A1 | 8/2017 | Skolianos et al. |
| 2018/0136486 A1 | 5/2018 | Macnamara et al. |
| 2018/0249151 A1 | 8/2018 | Freeman et al. |
| 2019/0094552 A1 | 3/2019 | Shousha |
| 2019/0125179 A1 | 5/2019 | Xu et al. |
| 2019/0129178 A1 | 5/2019 | Patterson et al. |
| 2019/0331920 A1 | 10/2019 | Watola et al. |
| 2020/0041796 A1 | 2/2020 | Samec et al. |
| 2020/0093361 A1 | 3/2020 | Jackson et al. |
| 2020/0107720 A1 | 4/2020 | Xiong et al. |
| 2020/0201069 A1 | 6/2020 | Stevens et al. |
| 2020/0341172 A1 | 10/2020 | Stevens et al. |
| 2022/0280037 A1 | 9/2022 | Colascione et al. |

FOREIGN PATENT DOCUMENTS

| | | |
|---|---|---|
| WO | WO-2019186132 A2 | 10/2019 |
| WO | 2020050496 | 3/2020 |
| WO | 2020116669 | 6/2020 |
| WO | WO-2022187824 A1 | 9/2022 |

OTHER PUBLICATIONS

U.S. Appl. No. 17/653,182, filed Mar. 2, 2022, Augmented Reality Vision Assessment.

U.S. Appl. No. 17/651,857, filed Feb. 21, 2022, Ophthalmic Imaging Using a Head-Worn Device.

"International Application Serial No. PCT/US2022/070912, International Search Report dated Jun. 13, 2022", 8 pgs.

"International Application Serial No. PCT/US2022/070912, Written Opinion dated Jun. 13, 2022", 9 pgs.

"European Application Serial No. 22162283.0, Extended European Search Report dated Aug. 9, 2022", 6 pgs.

"Optical head-mounted display—Wikipedia", [Online] Retrieved from the internet: <https://en.wikipedia.org/w/index.php?title=Optical_headmounted_display&oldid=988188679>, (Nov. 11, 2020), 6 pgs.

Heath, Alex, et al., "New Apple Mixed-Reality Headset Details: Swappable Headbands, Eye-Tracking", The Information, [Online] Retrieved from the Internet: <URL: https://www.theinformation.com/articles/new-apple-mixed-reality-headset-details-swappable-headbands-eye-tracking>, (Feb. 4, 2021), 5 pgs.

Madhusudhan, Mishra, et al., "Image Processing Techniques for Glaucoma Detection", Advances in Computing and Communications. ACC 2011. Communications in Computer and Information Science, vol. 192. Springer, Berlin, Heidelberg, (2011), 365-373.

Pathak, Shashwat, et al., "A Robust Automated Cataract Detection Algorithm Using Diagnostic Opinion Based Parameter Thresholding for Telemedicine Application", Electronics, 5(3), 57, (2016), 11 pgs.

"International Application Serial No. PCT/US2022/074269, International Search Report dated Nov. 15, 2022", 4 pgs.

"International Application Serial No. PCT/US2022/074269, Written Opinion dated Nov. 15, 2022", 5 pgs.

* cited by examiner

AUGMENTED REALITY DISPLAY FOR MACULAR DEGENERATION

RELATED APPLICATION DATA

This application claims the benefit of U.S. Provisional Patent Application Ser. No. 63/200,619, filed Mar. 18, 2021, the contents of which are included by reference as if explicitly set forth.

TECHNICAL FIELD

The present disclosure relates generally to wearable devices and more particularly to wearable device displays adapted for use with visual impairments.

BACKGROUND

A head-worn device may be implemented with a transparent or semi-transparent display through which a user of the wearable device can view the surrounding environment. Such devices enable a user to see through the transparent or semi-transparent display to view the surrounding environment, and to also see objects (e.g., virtual objects such as 3D renderings, images, video, text, and so forth) that are generated for display to appear as a part of, and/or overlaid upon, the surrounding environment. This is typically referred to as "augmented reality."

A head-worn device may additionally completely occlude a user's visual field and display a virtual environment through which a user may move or be moved. This is typically referred to as "virtual reality." As used herein, the term "augmented reality" or "AR" refers to both augmented reality and virtual reality as traditionally understood, unless the context indicates otherwise.

BRIEF DESCRIPTION OF THE SEVERAL VIEWS OF THE DRAWINGS

To easily identify the discussion of any particular, element or act, the most significant digit or digits in a reference number refer to the figure number in which that element is first introduced.

DETAILED DESCRIPTION

Known wearable devices, such as AR spectacles, include a transparent or semi-transparent display that enables a user to see through the transparent or semi-transparent display to view the surrounding environment. Additional information or objects (e.g., virtual objects such as 3D renderings, images, video, text, and so forth) are shown on the display and appear as a part of, and/or overlaid upon, the surrounding environment to provide an augmented reality experience for the user. The display may for example include a waveguide that receives a light beam from a projector but any appropriate display for presenting augmented or virtual content to the wearer may be used.

Such wearable devices are based on the assumption that the wearer has good or optically-correctable foveal vision, and are thus primarily directed to the presentation of information directly in front of the user. Individuals with macular degeneration may still have normal peripheral vision but impaired central vision due to degeneration of the macula.

People with degenerative vision issues may benefit from having centrally-located visual information remapped to or re-presented in a more peripheral location in which their vision has not been compromised. As disclosed in more detail below, central visual information captured by a forward-facing camera on a wearable device can be displayed on a display located in the user's peripheral vision, or this visual information can be remapped to an outer location on a forward or primary display on the wearable device. In some cases, the forward display may be a ring-shaped waveguide.

Figure 1:
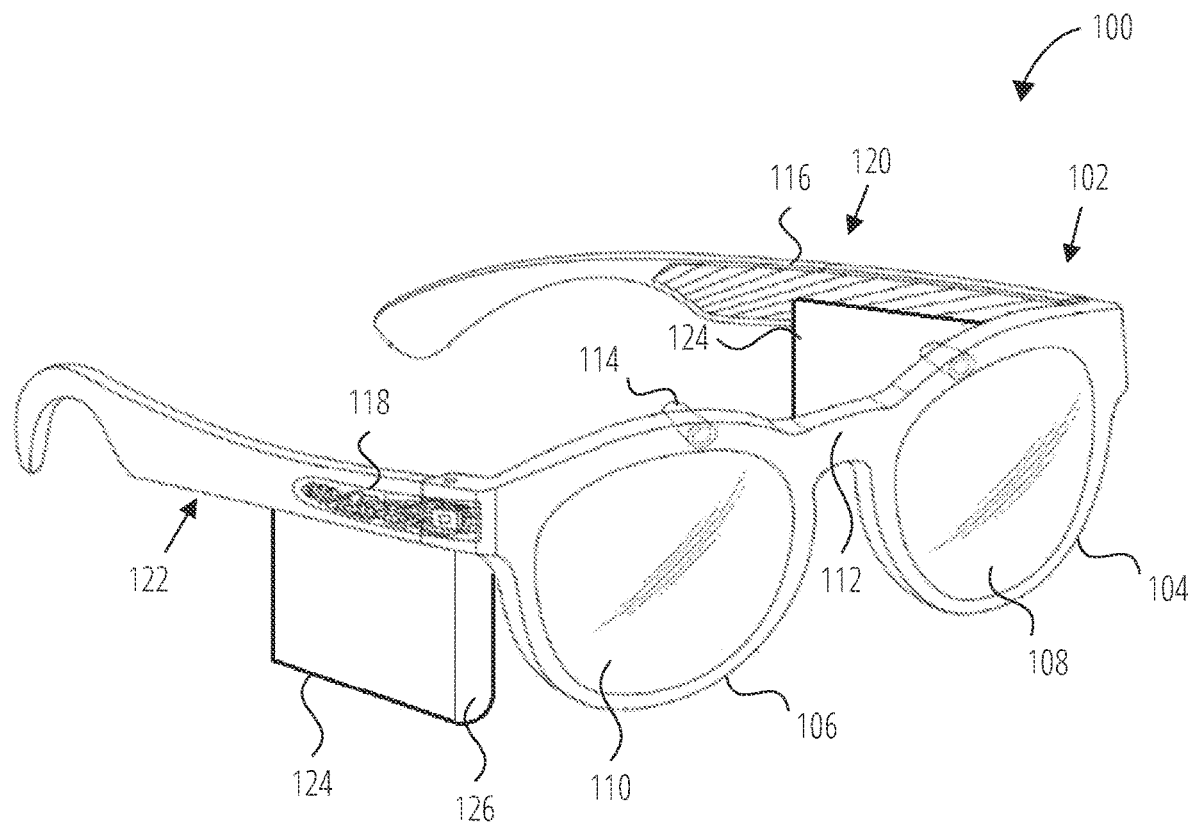
FIG. 1 is a perspective view of a wearable device, in accordance with some examples.

FIG. 1 is perspective view of a wearable device (e.g., glasses 100), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. Each of the right optical element 110 and the left optical element 108 can be a lens, a display, a display assembly, or a combination of the foregoing. Any suitable display assembly can be provided in the glasses 100.

The frame 102 additionally includes a left arm or temple piece 120 and a right arm or temple piece 122. In some examples the entire frame 102 can be formed from a single piece of material so as to have a unitary or integral construction.

The glasses 100 can include a computing device, such as a computer 118, which can be of any suitable type so as to be carried by the frame 102 and, in one or more examples, of a suitable size and shape, so as to be at least partially disposed in one of the temple pieces 120 and the temple piece 122. The computer 118 can include one or more processors with memory, wireless communication circuitry, and a power source. As discussed below, the computer 118 comprises low-power circuitry, high-speed circuitry, and a display processor. Various other examples may include these elements in different configurations or integrated together in different ways. Additional details of aspects of computer 118 may be implemented as illustrated by the data processor 302 discussed below.

The computer 118 additionally includes a battery 116 or other suitable portable power supply. In one example, the battery 116 is disposed in left temple piece 120 and is electrically coupled to the computer 118 disposed in the right temple piece 122. The glasses 100 can include a connector or port (not shown) suitable for charging the battery 116, a wireless receiver, transmitter or transceiver (not shown), or a combination of such devices.

The glasses 100 include cameras 114. Although two cameras are depicted, other examples contemplate the use of a single or additional (i.e., more than two) cameras. In one or more examples, the glasses 100 include any number of input sensors or other input/output devices in addition to the camera 114. Such sensors or input/output devices can additionally include biometric sensors, location sensors, motion sensors, and so forth.

The glasses 100 may also include peripheral displays 124 mounted to the left temple piece 120 and right temple piece 122. The peripheral displays 124 may be curved or include a curved portion 126 to provide a "wrap-around effect."

The cameras 114 are used to capture a forward view from the glasses 100. As described below, this forward view is then reprojected onto one or more displays provided in or on the glasses 100, such as peripheral displays 124 or near eye displays 408. The displays are described in more detail below with reference to FIG. 4.

Figure 2:
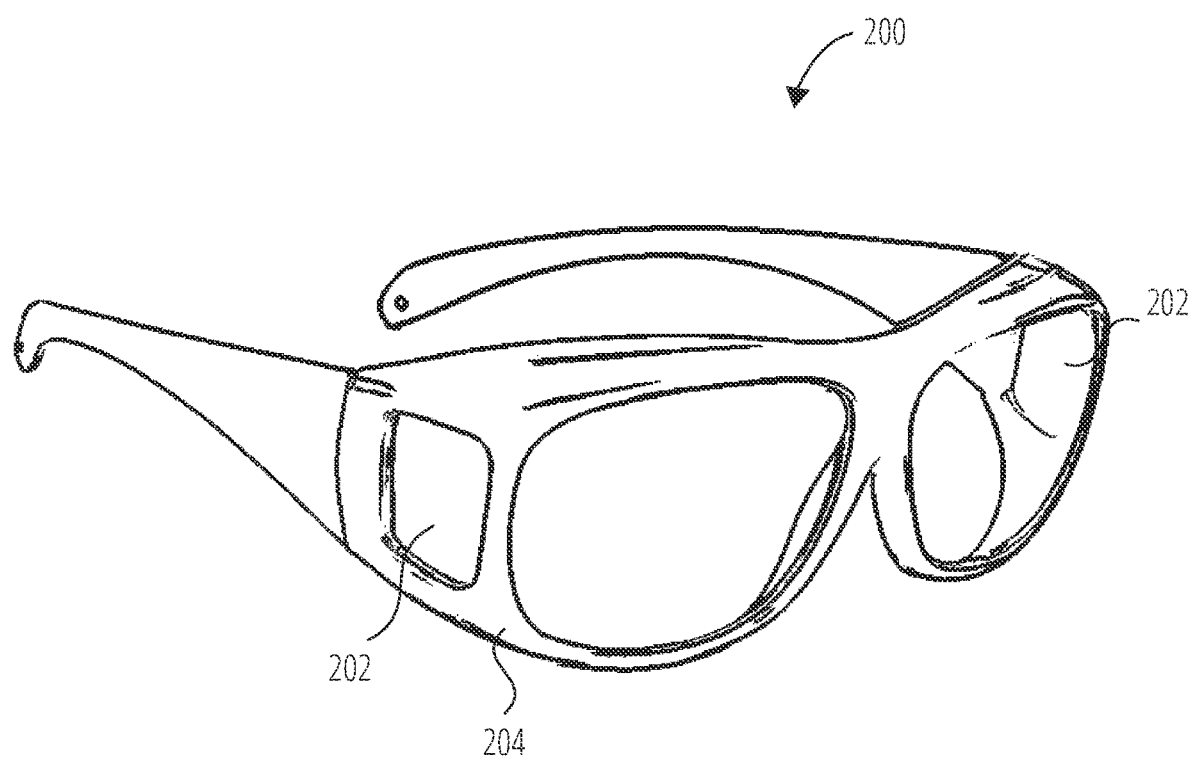
FIG. 2 is perspective view of a wearable device, in accordance with another example.

FIG. 2 is perspective view of a wearable device (e.g., glasses 200), in accordance with another example. As can be seen, in this example, peripheral displays 202 are integrated into a frame 204, the front part of which wraps around the user's eyes. The presence of the peripheral displays 202 in glasses 200 is thus less obtrusive and the overall appearance of the wearable device is more aesthetically pleasing. In yet another example, a single display may be provided for each eye, which wraps around the eye to permit the display of information both in a forward or near peripheral view and a side or far peripheral view.

Figure 3:
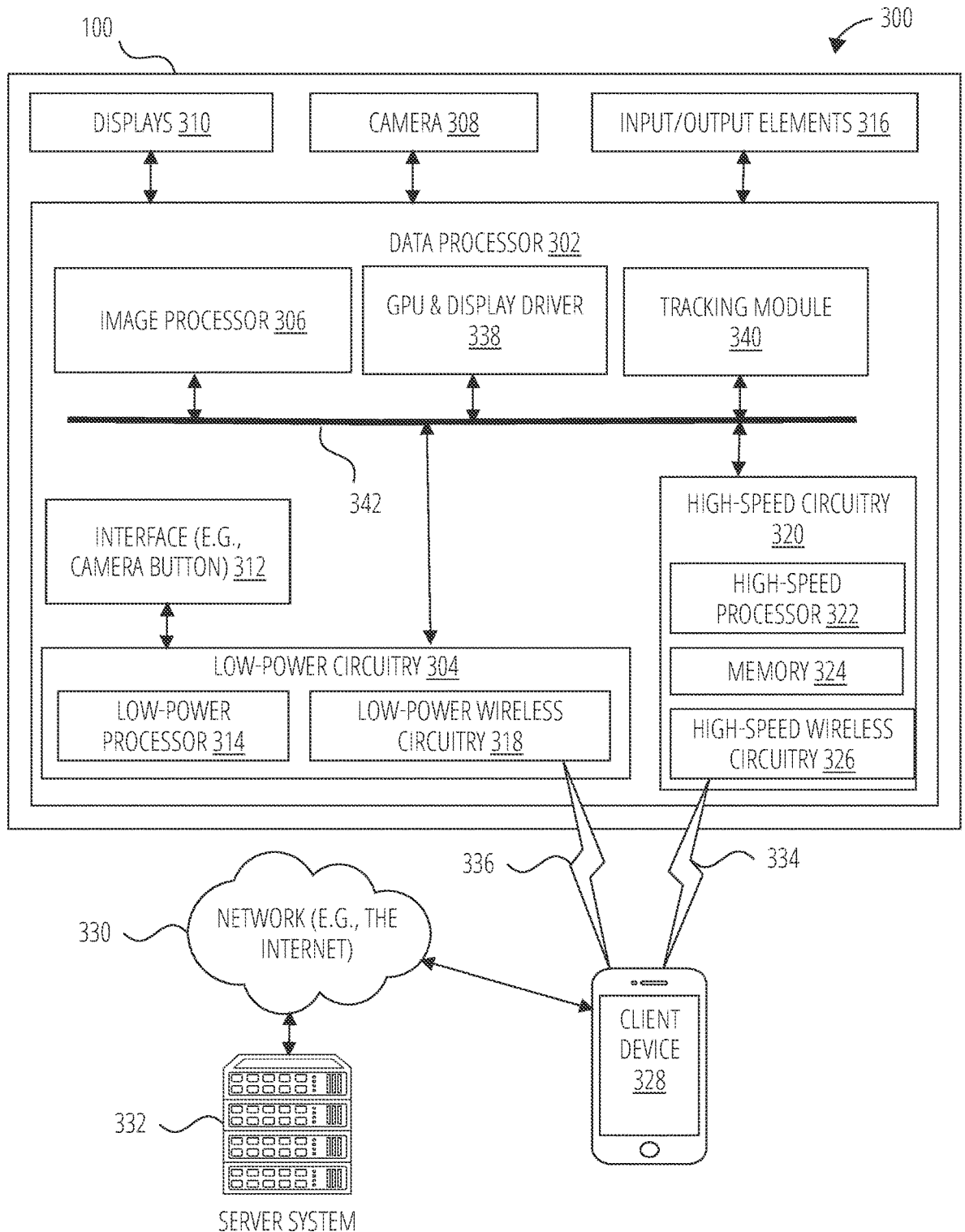
FIG. 3 is a block diagram illustrating a networked system including details of a camera device, in accordance with one example.

FIG. 3 is a block diagram illustrating a networked system 300 including details of the glasses 100, in accordance with some examples.

The networked system 300 includes the glasses 100, a client device 328, and a server system 332. The client device 328 may be a smartphone, tablet, phablet, laptop computer, access point, or any other such device capable of connecting with the glasses 100 using both a low-power wireless connection 336 and a high-speed wireless connection 334. The client device 328 is connected to the server system 332 via the network 330. The network 330 may include any combination of wired and wireless connections. The server system 332 may be one or more computing devices as part of a service or network computing system. The client device 328 and any elements of the server system 332 and network 330 may be implemented using details of the software architecture 704 or the machine 800 described in FIG. 7 and FIG. 8.

The glasses 100 include a data processor 302, displays 310, one or more cameras 308, and additional input/output elements 316. The input/output elements 316 may include microphones, audio speakers, biometric sensors, additional sensors, or additional display elements integrated with the data processor 302. Examples of the input/output elements 316 are discussed further with respect to FIG. 7 and FIG. 8. For example, the input/output elements 316 may include any of I/O components 806 including output components 828, motion components 836, and so forth. Examples of the displays 310 are discussed in FIG. 4. In the particular examples described herein, the displays 310 include a display for each one of a user's left and right eyes.

The data processor 302 includes an image processor 306 (e.g., a video processor), a GPU & display driver 338, a tracking module 340, an interface 312, low-power circuitry 304, and high-speed circuitry 320. The components of the data processor 302 are interconnected by a bus 342.

The interface 312 refers to any source of a user command that is provided to the data processor 302. In one or more examples, the interface 312 is a physical button on a camera that, when depressed, sends a user input signal from the interface 312 to a low-power processor 314. A depression of such a camera button followed by an immediate release may be processed by the low-power processor 314 as a request to capture a single image. A depression of such a camera button for a first period of time may be processed by the low-power processor 314 as a request to capture video data while the button is depressed, and to cease video capture when the button is released, with the video captured while the button was depressed stored as a single video file. In other examples, the interface 312 may be any mechanical switch or physical interface capable of accepting user inputs associated with a request for data from the camera 308. In other examples, the interface 312 may have a software component, or may be associated with a command received wirelessly from another source, such as from the client device 328.

The image processor 306 includes circuitry to receive signals from the camera 308 and process those signals from the camera 308 into a format suitable for storage in the memory 324 or for transmission to the client device 328. In one or more examples, the image processor 306 (e.g., video processor) comprises a microprocessor integrated circuit (IC) customized for processing sensor data from the camera 308, along with volatile memory used by the microprocessor in operation.

The low-power circuitry 304 includes the low-power processor 314 and the low-power wireless circuitry 318. These elements of the low-power circuitry 304 may be implemented as separate elements or may be implemented on a single IC as part of a system on a single chip. The low-power processor 314 includes logic for managing the other elements of the glasses 100. As described above, for example, the low-power processor 314 may accept user input signals from the interface 312. The low-power processor 314 may also be configured to receive input signals or instruction communications from the client device 328 via the low-power wireless connection 336. The low-power wireless circuitry 318 includes circuit elements for implementing a low-power wireless communication system. Bluetooth™ Smart, also known as Bluetooth™ low energy, is one standard implementation of a low power wireless communication system that may be used to implement the low-power wireless circuitry 318. In other examples, other low power communication systems may be used.

The high-speed circuitry 320 includes a high-speed processor 322, a memory 324, and a high-speed wireless circuitry 326. The high-speed processor 322 may be any processor capable of managing high-speed communications and operation of any general computing system needed for the data processor 302. The high-speed processor 322 includes processing resources needed for managing high-speed data transfers on the high-speed wireless connection 334 using the high-speed wireless circuitry 326. In certain examples, the high-speed processor 322 executes an operating system such as a LINUX operating system or other such operating system such as the operating system 712 of FIG. 7. In addition to any other responsibilities, the high-speed processor 322 executing a software architecture for the data processor 302 is used to manage data transfers with the high-speed wireless circuitry 326. In certain examples, the high-speed wireless circuitry 326 is configured to implement Institute of Electrical and Electronic Engineers (IEEE) 802.11 communication standards, also referred to herein as Wi-Fi. In other examples, other high-speed communications standards may be implemented by the high-speed wireless circuitry 326.

The memory 324 includes any storage device capable of storing camera data generated by the camera 308 and the image processor 306. While the memory 324 is shown as integrated with the high-speed circuitry 320, in other examples, the memory 324 may be an independent stand-alone element of the data processor 302. In certain such examples, electrical routing lines may provide a connection through a chip that includes the high-speed processor 322 from image processor 306 or the low-power processor 314 to the memory 324. In other examples, the high-speed processor 322 may manage addressing of the memory 324 such that the low-power processor 314 will boot the high-speed processor 322 any time that a read or write operation involving the memory 324 is needed.

The tracking module 340 estimates a pose of the glasses 100. For example, the tracking module 340 uses image data and corresponding inertial data from the camera 308 and the position components 840, as well as GPS data, to track a location and determine a pose of the glasses 100 relative to a frame of reference (e.g., real-world environment). The tracking module 340 continually gathers and uses updated sensor data describing movements of the glasses 100 to determine updated three-dimensional poses of the glasses 100 that indicate changes in the relative position and orientation relative to physical objects in the real-world environment. The tracking module 340 permits visual placement of virtual objects relative to physical objects by the glasses 100 within the field of view of the user via the displays 310.

The GPU & display driver 338 may use the pose of the glasses 100 to generate frames of virtual content or other content to be presented on the displays 310 when the glasses 100 are functioning in a traditional augmented reality mode. In this mode, the GPU & display driver 338 generates updated frames of virtual content based on updated three-dimensional poses of the glasses 100, which reflect changes in the position and orientation of the user in relation to physical objects in the user's real-world environment.

Additionally, when operating in a mode to provide an augmented reality display for visual impairment as described herein, the GPU & display driver 338 perform any required image processing as described in more detail below.

One or more functions or operations described herein may also be performed in an application resident on the glasses 100 or on the client device 328, or on a remote server. For example, one or more functions or operations described herein may be performed by one of the applications 706 such as messaging application 746 or a custom eye test application.

Figure 4:
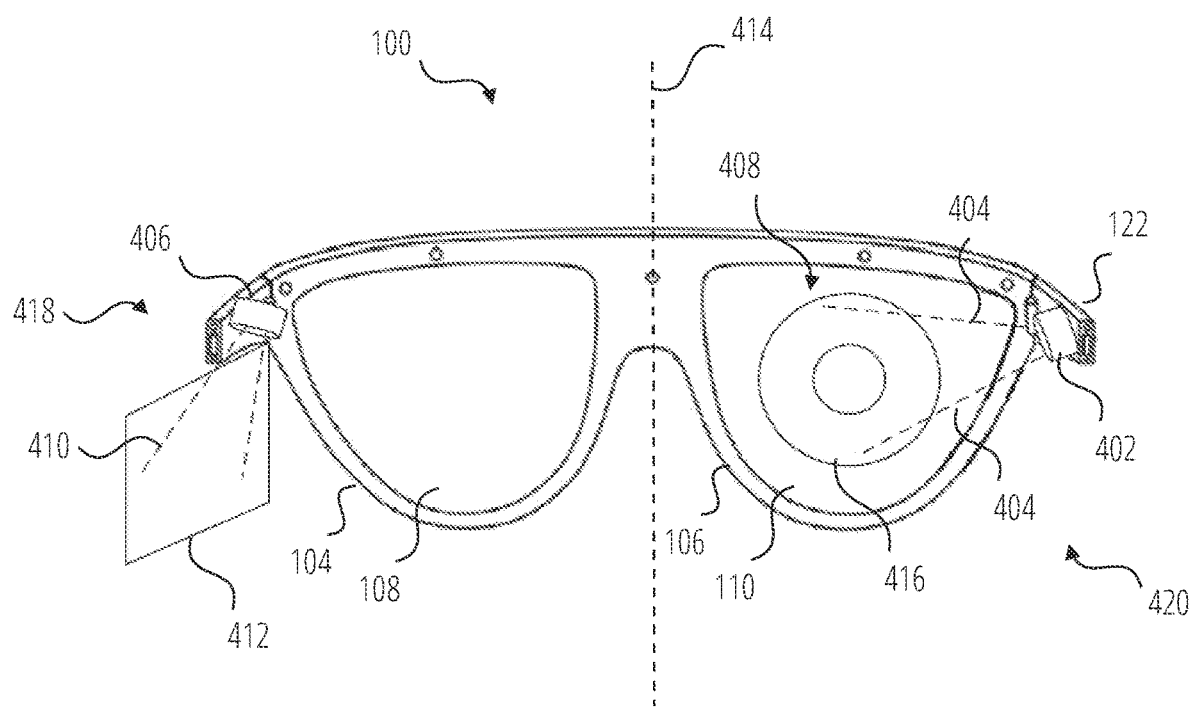
FIG. 4 illustrates a wearable device including forward and peripheral optical assemblies, in accordance with some examples.

FIG. 4 illustrates a wearable device (e.g., glasses 100) including forward and peripheral optical assemblies. As described in FIG. 1, the glasses 100 shown in FIG. 4 include left optical element 108 and right optical element 110 secured within each of the left optical element holder 104 and the right optical element holder 106 respectively.

The glasses 100 include forward optical assembly 420 comprising a projector 402 and a near eye display 408, and a peripheral optical assembly 418 comprising a projector 406 and a peripheral display 412. In an actual implementation, the forward and peripheral optical assemblies may be provided on both the left and right halves of the glasses 100. For purposes of clarity, the forward optical assembly 420 is shown on the right side and the peripheral optical assembly 418 is shown on the left side of the glasses 100, but it will be appreciated that either or both of these optical assemblies can, but are not required to be, mirrored about the plane of symmetry illustrated by dashed line 414, to provide one or both of a forward optical assembly 420 and a peripheral optical assembly 418 on each side of the glasses 100.

In one embodiment, the near eye display 408 is an optical waveguide 416 in the shape of a ring (e.g., an annulus or flattened torus). The waveguide 416 includes reflective or diffractive structures (e.g., gratings and/or optical elements such as mirrors, lenses, or prisms). Light 404 emitted by the projector 402 encounters the diffractive structures of the waveguide 416, which directs the light towards the eye of a user to provide an image on or in the right optical element 110 that overlays the view of the real world seen by the user. In an alternative embodiment, the near eye display 408 is provided as a rectangular shaped optical waveguide.

As described in more detail below, a video stream comprising a forward view from the glasses 100, captured by one of the cameras 114, is projected by the projector 402 onto the near eye display 408 such that a central portion of the forward view is remapped to an annular region corresponding to the waveguide 416. Central visual information that would not be seen, or only seen poorly, due to visual impairment resulting from macular degeneration is thus displayed to the user in a more peripheral perceptual region.

In an example in which the near eye display 408 is a rectangular optical waveguide, the central portion of the waveguide is unused. In the example in which the near eye display 408 is ring-shaped waveguide 416, the central reflective or diffractive structures are not present but the waveguide 416 is otherwise structurally the same as a rectangular waveguide. By eliminating unused reflective or diffractive structures, the performance of the near eye display 408 in regions of interest may be improved. For example, less power may be required to provide the same brightness levels.

It will be appreciated however that other display technologies or configurations may be provided that can display an image to a user in a forward field of view. For example, instead of a projector 402 and a waveguide 416, an LCD, LED or other display panel or surface may be provided instead.

In the case where left and right forward optical assemblies 420 are provided, the same remapped video feed from a single camera 114 (which may be centrally located on the glasses 100) may be provided on both left and right near eye displays 408. Alternatively, a remapped video feed from a left side camera 114 may be provided to a left near eye display 408 while a remapped video feed from a right-side camera 114 may be provided to a right side near eye display 408. Still further, the images displayed on the left and right near eye displays 408 may be a remapped video feed of respective left and right sides of a forward field of view. In such a case, the left and right side forward fields of view from which the images displayed on the left and right near eye displays 408 are derived may overlap partially or not overlap, with or without a gap between them if not overlapping.

In the illustrated example, the peripheral optical assembly 418 comprises a projector 406 and a peripheral display 412. As before, the peripheral display 412 may comprise a waveguide including reflective or diffractive structures (e.g., gratings and/or optical elements such as mirrors, lenses, or prisms). Light 410 emitted by the projector 406 encounters the diffractive structures of the peripheral display 412, which directs the light towards the eye of a user to provide an image in a peripheral perceptual region of a user wearing the glasses 100. It will be appreciated however that other display technologies or configurations may be provided that can display an image to a user in a peripheral field of view. For example, instead of a projector 406 and the peripheral display 412 being a waveguide, the peripheral display 412 may be an LCD, LED or other display panel or surface instead.

In use, a video stream comprising a forward view from the glasses 100, captured by one of the cameras 114, is projected by the projector 406 onto the peripheral display 412 such that a central portion of the forward view is displayed on the peripheral display 412. Central visual information that would not be seen, or only seen poorly, due to visual impairment resulting from macular degeneration, is thus displayed to the user in a more peripheral perceptual region.

The images displayed via the peripheral optical assembly 418 may be an unmodified video feed from one or more of the cameras 114. In the case where left and right peripheral optical assemblies 418 are provided, the same video feed from a single camera 114 (which may be centrally located on the glasses 100) may be provided on both left and right peripheral displays 412. Alternatively, a video feed from a left side camera 114 may be provided to a left peripheral display 412 while a video feed from a right-side camera 114 may be provided to a right-side peripheral display 412. Still further, the images displayed on the left and right peripheral displays 412 may be a video feed of respective left and right sides of a forward field of view. In such a case, the images displayed on the left and right peripheral displays 412 may overlap partially or not overlap, with or without a gap between them if not overlapping.

Figure 5:
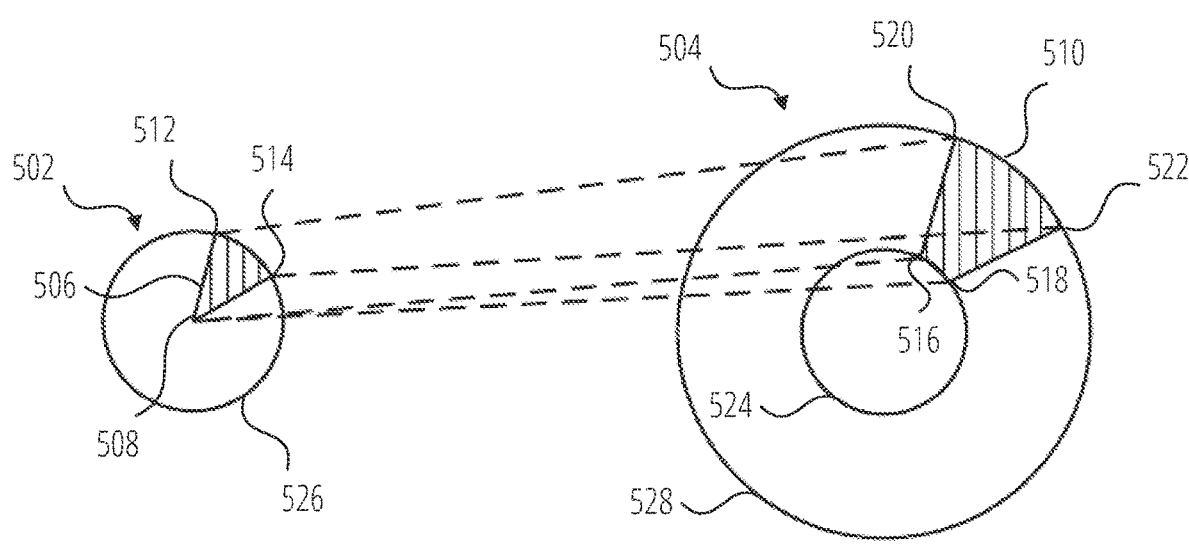
FIG. 5 illustrates the pixel mapping performed on a central portion of the forward view captured by a camera, for display to a user via a forward optical assembly.

FIG. 5 illustrates the pixel mapping performed on a central portion of the forward view captured by one or more of the cameras 114, for display to a user via the forward optical assembly 420. In FIG. 5, the central portion of the forward view, corresponding to what would normally be perceived by a macula or fovea, is represented by a disk 502, while the remapped forward view as displayed via the forward optical assembly 420 is represented by an annulus 504.

As can be seen, the center 508 of the disk 502 is mapped onto the inner circumference 524 of the annulus 504 while the circumference 526 of the disk 502 is mapped onto the outer circumference 528 of the annulus 504, with corresponding mappings of intermediate points between the center 508 and circumference 526 to intermediate points between the inner circumference 524 and the outer circumference 528.

A sector 506 of the disk 502 is thus mapped to a sector 510 of the annulus 504. More particularly, point 516 and point 518 of sector 510 can be seen to correspond to center 508 of sector 506, while point 520 and point 522 of sector 510 can be seen correspond to point 512 and point 514 of sector 506 in the mapping.

This mapping of the forward view captured by one or more of the cameras 114 can be achieved by conformal mapping or other image processing techniques. Additional image processing may also be applied as needed. For example, the area of the sector 510 can be seen to be larger than the area of the sector 506, and the area of the annulus 504 is larger than the area of the disk 502. Accordingly, it may be necessary to adjust the resolution of the video feed from that captured by a camera 114 or generate interpolated or other intermediate pixels for display via the forward optical assembly 420.

For example, using a polar coordinate system centered on the center 508 of the disk 502, the annulus 504 can be generated from the disk 502 as follows, where:
RD=radius of the disk 502.
RA1=inner radius of the annulus 504.
RA2=outer radius of the annulus 504.
RD1 [rd, θ]=radius of a disk pixel at radius rd and angle θ.
RA1 [rd, θ]=radius of an annular pixel corresponding to a disk pixel at RD1 [rd, θ]
Stepping through all values of θ from 0 to 2Pi radians and all values of rd from 0 to Rd,
RA1 [rd, θ]=RD+RD1 [rd, θ]*((RA2−RA1)/RD).

Figure 6:
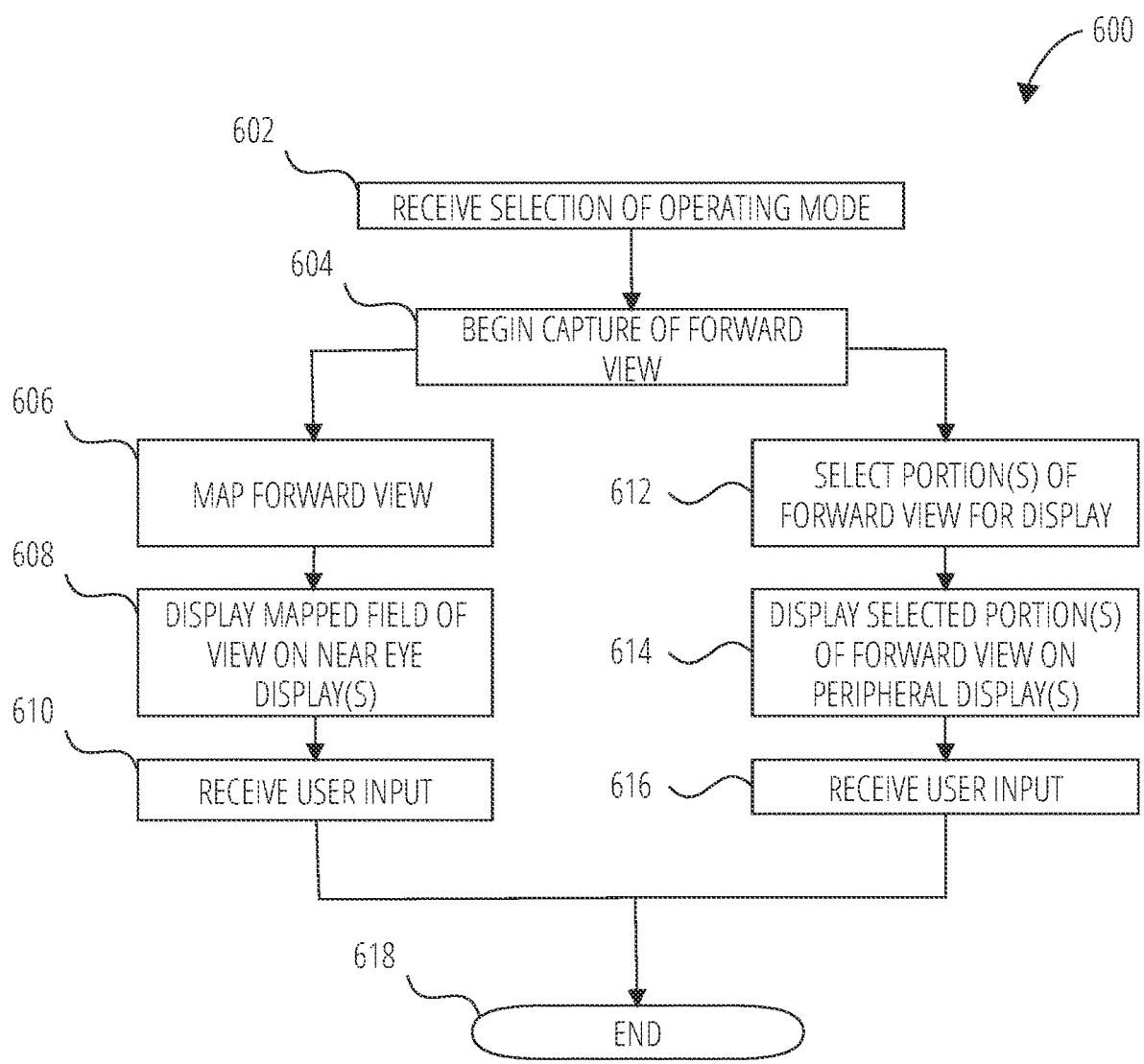
FIG. 6 is a flowchart illustrating a process for capturing and displaying a portion of the forward view from a head-worn device according to some examples.

FIG. 6 is a flowchart 600 illustrating a process for capturing and displaying a portion of the forward view from a head-worn device according to some examples. For explanatory purposes, the operations of the flowchart 600 are described herein as occurring in serial, or linearly. However, multiple operations of the flowchart 600 may occur in parallel. In addition, the operations of the flowchart 600 need not be performed in the order shown and/or one or more blocks of the flowchart 600 need not be performed and/or can be replaced by other operations.

The operations illustrated in FIG. 6 will typically execute on the data processor 302 and associated hardware in or associated with the glasses 100. For the purposes of clarity, flowchart 600 is discussed herein with reference to such an example. Various implementations are of course possible, with some of the operations taking place in client device 328 in an application such as messaging application 746, on server system 332, or with one application on the client device 328 calling another application or SDK for required functionality. In one example, the operations are performed jointly between messaging application 746 running on the client device 328 and the data processor 302 and associated hardware in or associated with the glasses 100.

The method starts at operation 602 with the messaging application 746 receiving user input corresponding to selection or activation of a visual-assistance operating mode. The nature of the selections that are available will depend on the configuration of the glasses 100. For example, if the forward optical assembly 420 includes a ring-shaped waveguide 416, then the glasses 100 are specifically for use in by persons with visual impairment and it may not be necessary to select a mode in which the forward view is mapped to the waveguide 416, since that mode is likely the default mode. On the other hand, if the near eye display 408 is a rectangular waveguide or some other rectangular display, then receipt of specific user selection of a visual assistance mode may be required to initiate the visual assistance mode.

Also, user selection to display forward information on the peripheral displays 412 will depend on whether or not those displays are present. If they are present, receipt of user selection may be required to initiate the visual assistance mode since the use of these displays is likely to be an optional and not a default mode. Furthermore, express selection or activation of these modes may also be required to preserve the battery life of the glasses 100. Selection of the mode may include selection of visual assistance mode for either the near eye displays or the peripheral displays, or both.

Upon receipt of user selection or activation of a visual assistance mode, an image feed corresponding to a forward view from the glasses 100 is captured by one or more of the cameras 114 at operation 604. If a near eye display visual assistance mode has been selected, the method proceeds at operation 606. If a peripheral display vision assistance mode has been selected, the method proceeds at operation 612. If both modes have been selected, the method proceeds at operation 606 and operation 612.

If a near eye display visual assistance mode has been selected, then at operation 606 the forward field(s) of view captured by the cameras 114 is/are mapped for display outside a central field of view by the data processor 302. The amount by which the mapping moves the field of view from the central field of view depends on the implementation. The fovea has an approximately 5 deg. field of view, paracentral vision is considered to be a field of view of approximately 8 deg., while the macula has an approximately 18 deg. field of view. Mid-peripheral vision is considered to be plus/minus 30 deg. In one example, the mapping takes the macular field of view (plus/minus approximately 9 deg.) and maps it to the mid-peripheral zone from between plus/minus approximately 9 deg to approximately plus/minus 30 deg. In another example, a central field of view from plus/minus 5 deg is mapped to a zone from between plus/minus approximately 5 deg to approximately plus/minus 25 deg.

In some embodiments, visual impairment of users may vary, and the angle of the field of view of the central field of view for mapping and the angular zone of the annulus to which the central field of view is mapped may be user-selectable via a user interface on the client device 328.

Additionally, it is not necessary that the field of views of the central to be mapped region and the as-mapped regions be adjacent. For example, a central field of view of plus/minus 15 deg. might be mapped to a mid-peripheral zone from outside plus/minus approximately 10 deg to approximately plus/minus 30 deg. This might be done to ensure that sufficient visual information is provided to the user, since the mapped and displayed visual information will otherwise obscure the user's mid-peripheral visual field.

As mentioned above, the central field of view that is mapped may differ for each eye, may come from different cameras for each eye, or may be different parts of the central field of view for each eye.

The mapped field of view is then displayed by the data processor 302 on one or both of the near-eye displays 310 at operation 608. The display(s) of the mapped field(s) of view continue until terminating user input is received at operation 610 and the method ends at operation 618.

If a peripheral display vision assistance mode has been selected, the method proceeds at operation 612 with selection of the portion of field(s) of view by the data processor 302 from one or more of the cameras 114 for display on the peripheral display 412. As described above, the same video feed from a single camera 114 (which may be centrally located on the glasses 100) may be provided on both left and right near eye displays 408. Alternatively, a video feed from a left side camera 114 may be provided to a left near eye display 408 while a video feed from a right-side camera 114 may be provided to a right side near eye display 408. Still further, the images displayed on the left and right near eye displays 408 may be a video feed of respective left and right forward fields of view. In such a case, the left and right forward fields of view from which the images displayed on the left and right near eye displays 408 are derived may overlap partially or not overlap, with or without a gap between them if not overlapping. Additionally, a central portion of the field(s) of view of the camera(s) might be cropped from the field of view of the camera(s) so that more relevant central visual information is presented on the peripheral display(s).

This selection of the nature and scope of the displayed portions of the forward field of view by the data processor 302 is based on parameters that may be user selectable, for example which and how many cameras to use, how much of the central field of view to display, which portions to display to each eye, and so forth.

The selected forward view(s) are then displayed to the user on the peripheral displays 412 at operation 614. The display(s) of the mapped field(s) of view continue until terminating user input is received at operation 616 and the method ends at operation 618.

Figure 7:
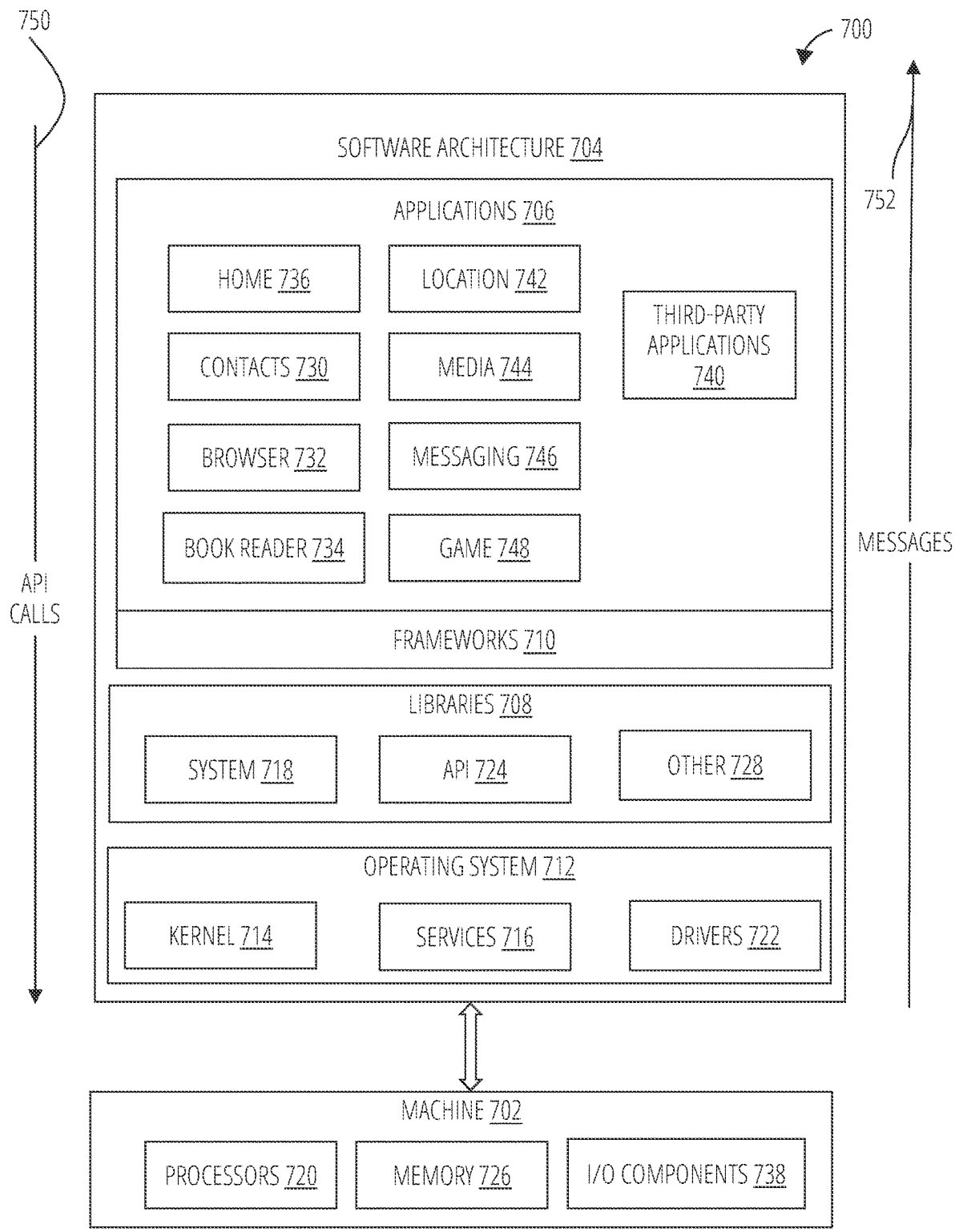
FIG. 7 is block diagram showing a software architecture within which the present disclosure may be implemented, in accordance with some examples.

FIG. 7 is a block diagram 700 illustrating a software architecture 704, which can be installed on any one or more of the devices described herein. The software architecture 704 is supported by hardware such as a machine 702 that includes processors 720, memory 726, and I/O components 738. In this example, the software architecture 704 can be conceptualized as a stack of layers, where each layer provides a particular functionality. The software architecture 704 includes layers such as an operating system 712, libraries 708, frameworks 710, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionality. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 708 provide a low-level common infrastructure used by the applications 706. The libraries 708 can include system libraries 718 (e.g., C standard library) that provide functions such as memory allocation functions, string manipulation functions, mathematic functions, and the like. In addition, the libraries 708 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 708 can also include a wide variety of other libraries 728 to provide many other APIs to the applications 706.

The frameworks 710 provide a high-level common infrastructure that is used by the applications 706. For example, the frameworks 710 provide various graphical user interface (GUI) functions, high-level resource management, and high-level location services. The frameworks 710 can provide a broad spectrum of other APIs that can be used by the applications 706, some of which may be specific to a particular operating system or platform.

In an example, the applications 706 may include a home application 736, a contacts application 730, a browser application 732, a book reader application 734, a location application 742, a media application 744, a messaging application 746, a game application 748, and a broad assortment of other applications such as third-party applications 740. The applications 706 are programs that execute functions defined in the programs. Various programming languages can be employed to create one or more of the applications 706, structured in a variety of manners, such as object-oriented programming languages (e.g., Objective-C, Java, or C++) or procedural programming languages (e.g., C or assembly language). In a specific example, the third-party applications 740 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 740 can invoke the API calls 750 provided by the operating system 712 to facilitate functionality described herein.

Figure 8:
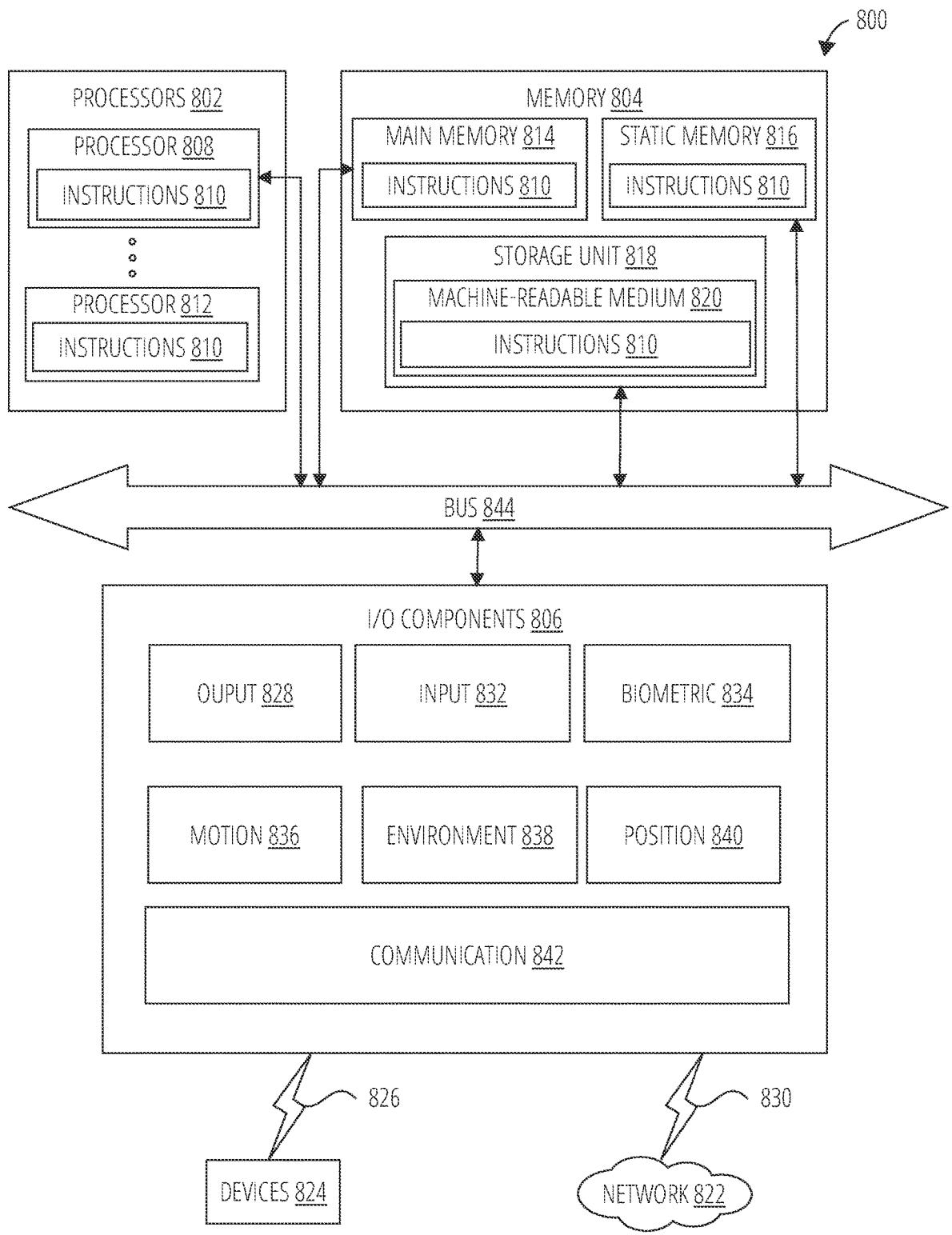
FIG. 8 is a diagrammatic representation of a machine, in the form of a computer system within which a set of instructions may be executed for causing the machine to perform any one or more of the methodologies discussed, in accordance with some examples.

FIG. 8 is a diagrammatic representation of a machine 800 within which instructions 810 (e.g., software, a program, an application, an applet, an app, or other executable code) for causing the machine 800 to perform any one or more of the methodologies discussed herein may be executed. For example, the instructions 810 may cause the machine 800 to execute any one or more of the methods described herein. The instructions 810 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 810, sequentially or otherwise, that specify actions to be taken by the machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 802, memory 804, and I/O components 806, which may be configured to communicate with each other via a bus 844. In an example, the processors 802 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 808 and a processor 812 that execute the instructions 810. The term "processor" is intended to include multi-core processors that may comprise two or more independent processors (sometimes referred to as "cores") that may execute instructions contemporaneously. Although FIG. 8 shows multiple processors 802, the machine 800 may include a single processor with a single core, a single processor with multiple cores (e.g., a multi-core processor), multiple processors with a single core, multiple processors with multiples cores, or any combination thereof.

The memory 804 includes a main memory 814, a static memory 816, and a storage unit 818, both accessible to the processors 802 via the bus 844. The main memory 804, the static memory 816, and storage unit 818 store the instructions 810 embodying any one or more of the methodologies or functions described herein. The instructions 810 may also reside, completely or partially, within the main memory 814, within the static memory 816, within machine-readable medium 820 within the storage unit 818, within at least one of the processors 802 (e.g., within the processor's cache memory), or any suitable combination thereof, during execution thereof by the networked system 300.

The I/O components 806 may include a wide variety of components to receive input, provide output, produce output, transmit information, exchange information, capture measurements, and so on. The specific I/O components 806 that are included in a particular machine will depend on the type of machine. For example, portable machines such as mobile phones may include a touch input device or other such input mechanisms, while a headless server machine will likely not include such a touch input device. It will be appreciated that the I/O components 806 may include many other components that are not shown in FIG. 8. In various examples, the I/O components 806 may include output components 828 and input components 832. The output components 828 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 832 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 806 may include biometric components 834, motion components 836, environmental components 838, or position components 840, among a wide array of other components. For example, the biometric components 834 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion sensor components 836 include acceleration sensor components (e.g., accelerometer), gravitation sensor components, rotation sensor components (e.g., gyroscope), and so forth. The environmental components 838 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 840 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 806 further include communication components 842 operable to couple the networked system 300 to a network 822 or devices 824 via a coupling 830 and a coupling 826, respectively. For example, the communication components 842 may include a network interface component or another suitable device to interface with the network 822. In further examples, the communication components 842 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 824 may be another machine or any of a wide variety of peripheral devices (e.g., a peripheral device coupled via a USB).

Moreover, the communication components 842 may detect identifiers or include components operable to detect identifiers. For example, the communication components 842 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 842, such as location via Internet Protocol (IP) geolocation, location via Wi-Fi® signal triangulation, location via detecting an NFC beacon signal that may indicate a particular location, and so forth.

The various memories (e.g., memory 804, main memory 814, static memory 816, and/or memory of the processors 802) and/or storage unit 818 may store one or more sets of instructions and data structures (e.g., software) embodying or used by any one or more of the methodologies or functions described herein. These instructions (e.g., the instructions 810), when executed by processors 802, cause various operations to implement the disclosed examples.

The instructions 810 may be transmitted or received over the network 822, using a transmission medium, via a network interface device (e.g., a network interface component included in the communication components 842) and using any one of a number of well-known transfer protocols (e.g., hypertext transfer protocol (HTTP)). Similarly, the instructions 810 may be transmitted or received using a transmission medium via the coupling 826 (e.g., a peer-to-peer coupling) to the devices 824.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

An "ephemeral message" refers to a message that is accessible for a time-limited duration. An ephemeral message may be a text, an image, a video and the like. The access time for the ephemeral message may be set by the message sender. Alternatively, the access time may be a default setting, or a setting specified by the recipient. Regardless of the setting technique, the message is transitory.

A "machine-storage medium" refers to a single or multiple storage devices and/or media (e.g., a centralized or distributed database, and/or associated caches and servers) that store executable instructions, routines and/or data in a non-transitory manner. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method of providing visual assistance using a head-worn device including one or more display devices and one or more cameras, comprising:
   receiving user input defining a size of a forward visual field;
   receiving user input defining a size of a peripheral field of view;
   capturing the forward visual field using at least one of the cameras;
   mapping a central portion of the forward visual field to a near-peripheral field of view; and
   displaying the mapped central portion of the forward visual field in the near-peripheral field of view using a forward display device of the one or more of the display devices.

2. The method of claim 1 wherein the mapped central portion is displayed in an annulus shape using the forward display device.

3. The method of claim 2 wherein the forward display device includes an annular waveguide.

4. The method of claim 1 wherein a portion of the forward visual field is displayed in a peripheral field of view using a peripheral display device of the head-worn device.

5. The method of claim 1 wherein the forward visual field of view comprises a first portion and a second portion, the method further comprising:
   displaying the first portion using a left display device; and
   displaying the second portion using a right display device.

6. The method of claim 5 wherein the first portion and the second portion partially overlap.

7. The method of claim 1, further comprising:
   receiving user selection of a portion of the forward visual field; and
   displaying the selected portion of the forward visual field in a peripheral field of view using a peripheral display of the head-worn device.

8. A head-worn device system comprising:
   one or more cameras;
   one or more display devices;
   one or more processors; and
   a memory storing instructions that, when executed by the one or more processors, configure the system to perform operations comprising:
      receiving user input defining a size of a forward visual field;
      receiving user input defining a size of a peripheral field of view;
      capturing the forward visual field using at least one of the cameras;
      mapping a central portion of the forward visual field to a near-peripheral field of view; and
      displaying the mapped central portion of the forward visual field in the near-peripheral field of view using a forward display device of the one or more of the display devices.

9. The system of claim 8 wherein the mapped central portion is displayed in an annulus shape using the forward display device.

10. The system of claim 8 wherein the operations further comprise:
   receiving user selection of a portion of the forward visual field; and
   displaying the selected portion of the forward visual field in a peripheral field of view using a peripheral display device of the head-worn device system.

11. The system of claim 10, wherein the forward visual field of view comprises a first portion and a second portion, the instructions further configuring the system to perform operations comprising:
   displaying the first portion using a left display device; and
   displaying the second portion using a right display device.

12. A non-transitory computer-readable storage medium, the computer-readable storage medium including instructions that when executed by a computer system, cause the computer system to provide display output using a head-worn device including one or more display devices and one or more cameras by performing operations comprising:
   receiving user input defining a size of a forward visual field;
   receiving user input defining a size of a peripheral field of view;
   capturing the forward visual field using at least one of the cameras; and
   displaying a portion of the forward visual field in the peripheral field of view using a peripheral display device of the one or more of the display devices.

13. The computer-readable storage medium of claim 12 wherein the instructions further configure the computer system to perform operations comprising:
   mapping a central portion of the forward visual field to a near-peripheral field of view,
   wherein the mapped central portion is displayed in the near-peripheral field of view using a forward display device of the head-worn device.

14. The computer-readable storage medium of claim 12, wherein the forward visual field of view comprises a first portion and a second portion, and wherein the instructions further configure the computer system to perform operations comprising:
  displaying the first portion using a left display device; and
  displaying the second portion using a right display device.

* * * * *